United States Patent Office 2,978,495
Patented Apr. 4, 1961

2,978,495
NITRAMINO ESTERS

Milton B. Frankel, Pasadena, and Karl Klager, Monrovia, Calif., assignors to Aerojet-General Corporation, Azusa, Calif., a corporation of Ohio No Drawing. Filed Aug. 22, 1955, Ser. No. 529,945

10 Claims. (Cl. 260—482)

This invention relates to new compositions of matter and a method for their preparation. In particular, it relates to nitramino esters having the general formula:

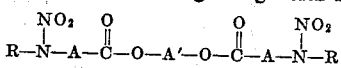

wherein R is alkyl and A and A' are alkylene radicals

These compounds are excellent plasticizers for nitropolymers, such as the polyurethane propellants disclosed in assignee's copending application Serial No. 422,649, filed April 12, 1954, now abandoned, as well as polymeric explosives such as nitrocellulose. Commercial plasticizers used at the present time are non-explosive and hence detract from the explosive power of the nitropolymers into which they are incorporated. The compounds of this invention, however, are not only plasticizers but also exhibit high explosive energy, as evidenced by their specific impulses.

The nitropolymers can be polymerized in the presence of the nitramino ester or the nitramino ester can be mixed into the nitropolymer after polymerization. The plasticizer is incorporated into the nitropolymer in amounts preferably from about 10% to about 40% by weight of the composition.

The nitramino esters of this invention are prepared by reacting a nitramino acid halide with a diol, in accordance with the general reaction scheme set forth below:

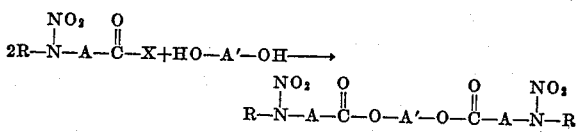

wherein R is alkyl, X is a halogen radical and A and A' are alkylene radicals. Compounds wherein the R's are different can be prepared by reacting a mixture of acids with a diol in accordance with the general reaction scheme set forth above.

Increased smoothness of reaction is obtained when the reaction is conducted in the presence of a solvent such as chloroform or absolute ether.

In order to maintain a convenient reaction rate, the reaction is preferably conducted at about reflux temperature. Other temperatures can be used, however, at lower temperatures the reaction is slow, while at higher temperatures it is difficult to control.

The acid halides used as starting materials are prepared by reacting their corresponding acids with a halogenation agent such as thionyl chloride. The nitramino acids are prepared by hydrolysis of their corresponding nitriles, as disclosed in our copending application Serial No. 514,386, filed June 9, 1955, or by the condensation of a nitroalkanol with an amino acid, as disclosed in assignee's copending application Serial No. 416,386, filed March 15, 1954, now abandoned.

To more clearly illustrate our invention, the following examples are presented. It is to be understood, however, that these examples are presented merely as a means of illustration and are not intended to limit the scope of the invention in any way.

EXAMPLE I

*Preparation of ethylene bis-4-nitrazapentanoate*

A mixture of 12.0 gm. of ethylene glycol, 84.0 gm. of 4-nitrazapentanoyl chloride, and 100 ml. of chloroform was refluxed for 20 hours. The solution was cooled, diluted with an equal volume of chloroform, washed with 150 ml. of water, 150 ml. of 1% sodium hydroxide solution and 150 ml. of water. The chloroform extract was separated, dried and concentrated in vacuo leaving 66.0 gm. of brown oil. The oil was crystallized from methanol, 43.0 gm., M.P. 58–58.5°.

Other members of the disclosed class of esters are prepared in the manner described in Example I using different starting materials. For example, ethylene bis-3-nitrazabutanoate is prepared by reacting ethylene glycol with 3-nitrazabutanoyl halide; propylene bis-3-nitrazapentanoate is prepared by reacting propylene glycol with 3-nitrazapentaoyl halide; and ethylene bis-4-nitrazaheptanoate is prepared by reacting ethylene glycol with 4-nitrazaheptanoyl halide.

Any member of the disclosed class of nitramino esters can be prepared by reacting an appropriate alcohol with a nitramino acid or acid halide, in accordance with the teachings of this invention.

We claim:

1. As compositions of matter, nitramino esters having the general formula:

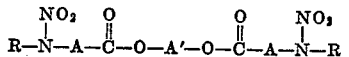

wherein R is a lower alkyl radical and A and A' are lower alkylene radicals.

2. As a composition of matter, ethylene bis-4-nitrazapentanoate having the structural formula:

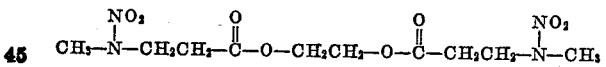

3. As a composition of matter, ethylene bis-3-nitrazabutanoate having the structural formula:

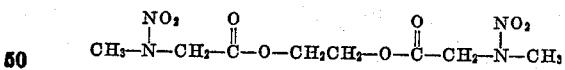

4. As a composition of matter, propylene bis-3-nitrazapentanoate having the structural formula:

5. As a composition of matter, ethylene bis-4-nitrazaheptanoate having the structural formula:

6. The method of preparing nitramino esters having the general formula:

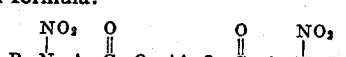

which comprises reacting a lower alkanediol with an acid having the general formula:

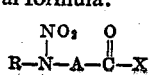

wherein R is a lower alkyl radical, X is a halogen radical and A and A' are lower alkylene radicals.

7. The method of preparing ethylene bis-4-nitrazapentanoate which comprises reacting ethylene glycol with 4-nitrazapentanoyl chloride.

8. The method of preparing ethylene bis-3-nitrazabutanoate which comprises reacting ethylene glycol with 3-nitrazabutanoyl halide.

9. The method of preparing propylene bis-3-nitrazapentanoate which comprises reacting propylene glycol with 3-nitrazapentanoyl halide.

10. The method of preparing ethylene bis-4-nitrazaheptanoate which comprises reacting ethylene glycol with 4-nitrazaheptanoyl halide.

References Cited in the file of this patent

Hackh's Chemical Dictionary, 3rd Ed., Blakiston Co., Philadelphia, Pa. (1950), p. 572.

Barrott et al.: J. Chem. Soc. (1953), pp. 1998–2005.